(12) United States Patent
Merkle (10) Patent No.: US 6,839,839 B1
(45) Date of Patent: Jan. 4, 2005

(54) PUBLIC KEY DISTRIBUTION USING AN APPROXIMATE LINEAR FUNCTION

(75) Inventor: Ralph C. Merkle, Sunnyvale, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/501,181

(22) Filed: Feb. 10, 2000

(51) Int. Cl.[7] ............................................... H04L 9/00
(52) U.S. Cl. ...................................................... 713/171
(58) Field of Search .......................... 713/171; 705/71; 380/263, 277, 278, 46, 30, 282, 286, 281, 260

(56) References Cited

U.S. PATENT DOCUMENTS

| | | | |
|---|---|---|---|
| 4,218,582 A | 8/1980 | Hellman et al. | |
| 5,297,206 A | 3/1994 | Orton | 380/30 |
| 5,338,959 A | 8/1994 | Kim et al. | 257/331 |
| 5,349,228 A | 9/1994 | Neudeck et al. | 257/365 |
| 5,602,047 A | 2/1997 | Tsai et al. | 437/41 |

OTHER PUBLICATIONS

Ralph C. Merkle, "Public key distribution using approximately linear functions", 1998, pp. 1–16.*

Merkle et al., "Hiding Information and Signatures in Trapdoor Knapsacks," IEEE Transactions on Information Theory, IEEE Inc., vol. IT–24, No. 5, pps. 525–530 New York, Sep. 1978.

Lu et al., "A Conference Key Distribution System Based on the Lagrange Interpolating Polynominal" Networks: Evolution or Revolution? New Orleans, Mar. 27–31, 1988, Proceedings of the Annual Joint Conference of the Computer and Communications Societies, New York, IEEE, vol. Conf. 7, Mar. 27, 1988, pps. 1092–1094.

Leonard M. Adleman, *On Breaking the Iterated Merkle–Hellman public–Key Cryptosystem*, Advances in Cryptology Proceedings of Crypto 1982, Plenum Press 1983, pp. 303–308.

Ernest F. Brickell, *Breaking Iterated Knapsacks*, Advances in Cryptology Proceedings of Crypto 1984, Springer Verlag, 1985, pp. 342–358.

* cited by examiner

*Primary Examiner*—Gregory Morse
*Assistant Examiner*—Thomas Ho
(74) *Attorney, Agent, or Firm*—Finnegan, Henderson, Farabow, Garrett & Dunner L.L.P.

(57) ABSTRACT

A completely new and fast public key distribution algorithm is presented which uses only a modest number of weighted multi-precision integer additions (with small integer weights). In a method consistent with the present invention, a first entity determines a first value, x, and determines a weighted sum based on the first value and a first part of a public key corresponding to the second entity. The first entity transmits the weighted sum to the second entity and determines a first comparator based on the first value and a second part of a public key corresponding to the second entity. The second entity determines a second comparator representing an approximate version of the first comparator. Based on the first and second comparators, the first and second entities can agree on cryptographic key information. In one embodiment of the present invention, the first entity determines a first comparator based on a first approximately linear function, the first value, and a second part of a public key corresponding to the second entity, and the second entity determines a second comparator based on the second value and a second approximately linear function related to the first approximately linear function. In one embodiment of the present invention, the method of agreeing on cryptographic key information is based on an approximate linear function, i.e., a family of functions AL(*, w) such that AL(i+j, w)~AL(i, w)+AL(j, w), where w parameterizes the family.

22 Claims, 3 Drawing Sheets

PUBLIC KEY DISTRIBUTION USING AN APPROXIMATE LINEAR FUNCTION

BACKGROUND OF THE INVENTION

The present invention relates generally to cryptographic methods and systems to be used in digital data processing and, in particular, is directed to methods and systems for public key distribution.

Key management and distribution is an extremely important aspect of secure communications systems based on cryptographic methods. Even the most secure cryptographic algorithm instantly becomes insecure if the corresponding keys fall into the wrong hands. In fact, cryptanalysts and hackers alike frequently begin the exploitation of cryptosystems by attempting to obtain and exploit the keys, since this is often easier and more cost efficient. As a result, much attention has been given to devising cryptographic methods and systems that allow secure, but simple, distribution of cryptographic key information.

Early concerns for key distribution lead to the invention of public-key cryptography. Public-key cryptographic algorithms employ an encryption key that is different from the decryption key. Since the algorithms are designed so that it is computationally infeasible to determine the decryption key from the encryption key, the encryption key can be made "public." Anyone may use a public encryption key to encrypt a message, but only a recipient with the corresponding "private" key may decrypt the message.

The first algorithm for generalized public-key encryption was the knapsack algorithm developed by Ralph Merkle and Martin Hellman. Knapsack algorithms get their security from the knapsack problem. Given a one-dimensional knapsack of length S and n rods of lengths $a_1, a_2, \ldots, a_n$, the "knapsack problem" is to find a subset of rods which exactly fill the knapsack, if such a subset exists. An equivalent way of expressing the knapsack problem is to find a binary n-vector x such that $S=a*x$, if such an x exists. When used in vector notation, the mathematical symbol "*" means to compute the dot product of two or more vectors. In the knapsack problem, finding a solution, x, is widely believed to be an NP-complete problem, and so is presumed to be difficult.

Mathematical problems classified as "NP-complete" are believed to be so mathematically complex as to be solvable in polynomial time only on a non-deterministic Turing machine or, in other words, by exhaustively trying all possible solutions. For additional discussion of NP-completeness and complexity theory, see Michael R. Gray and David S. Johnson, "Computers and Intractability: A Guide to the Theory of NP-Completeness," (W. H. Freeman and Co. 1979). Cryptographic algorithms that are NP-complete, therefore, are generally resistant to brute-force exhaustive attacks.

In their paper, Merkle and Hellman proposed a public key system that was derived by creating instances of the knapsack problem that could be solved if certain secret information was known. See Ralph C. Merkle and Martin Hellman, "Hiding Information and Signatures in Trapdoor Knapsaks," IEEE Transactions on Information Theory, v. 24, n. 5, September 1978, pp. 525–530. Unfortunately, this system proved to be less secure than the general (unrestricted) knapsack problem. See Leonard M. Adelman, "On Breaking the Iterated Merkle-Hellman Public Key Cryptosystem", Advances in Cryptology Proceedings of Crypto '82, Plenum Press 1983, pages 303–308; Ernest F. Brickell, "Breaking iterated knapsacks." Advances in Cryptology, Proceedings of Crypto '84, Springer Verlag, 1985, pp. 342–358.

Public-key cryptographic systems solve the key distribution problem, however, most are computationally intensive and therefore slow to operate on conventional computer systems. One of the most frequently used public-key cryptosystems, the RSA cryptographic algorithm, for example, requires integer exponentiation with moduli that are often in excess of 1,000 bits.

Therefore, a need exists for secure cryptographic methods and systems that both are computationally more efficient than conventional systems yet also solve the key distribution and management problems of conventional approaches.

SUMMARY OF THE INVENTION

Methods, systems, and articles of manufacture consistent with the present invention provide means for two entities to agree on common cryptographic key information over an insecure communications channel. The second entity is associated with a public/private key pair based on a public key algorithm. In a method consistent with the present invention, a first entity determines a first value, x, and determines a weighted sum based on the first value and a first part of a public key corresponding to the second entity. The first entity transmits the weighted sum to the second entity and determines a first comparator based on the first value and a second part of a public key corresponding to the second entity. The second entity determines a second comparator representing an approximate version of the first comparator. Based on the first and second comparators, the first and second entities can agree on cryptographic key information. In one embodiment of the present invention, the first entity determines a first comparator based on a first approximately linear function, the first value, and a second part of a public key corresponding to the second entity, and the second entity determines a second comparator based on the second value and a second approximately linear function related to the first approximately linear function.

BRIEF DESCRIPTION OF THE DRAWINGS

The accompanying drawings, which are incorporated in and constitute a part of this specification, illustrate an embodiment of the invention and, together with the description, serve to explain the principles of the invention.

FIG. 3 illustrates one exemplary system for public key distribution between

DESCRIPTION OF THE PREFERRED EMBODIMENTS

Reference will now be made in detail to embodiments of the invention, examples of which are illustrated in the accompanying drawings. Methods, systems, and articles of manufacture disclosed herein consistent with the principles of the invention may be used for performing public key distribution using an approximate linear function.

A public-key algorithm is any algorithm which uses two different "keys," one for encryption and another for decryption. Because one key cannot be easily determined from the other, the public key may be handed out freely, distributed over insecure channels, and posted publicly without compromising the security of an encryption system based on the public-key algorithm.

When two parties want to communicate using a public key cryptosystem over an insecure communication channel, the parties must have compatible cryptographic devices.

One party must possess an enciphering device that performs a transformation based on a public key algorithm and an encryption key, E, and the other party must possess a deciphering device that performs the inverse transformation based on the same public key algorithm and the decryption key, D, that corresponds to the encryption key.

Figure 1:
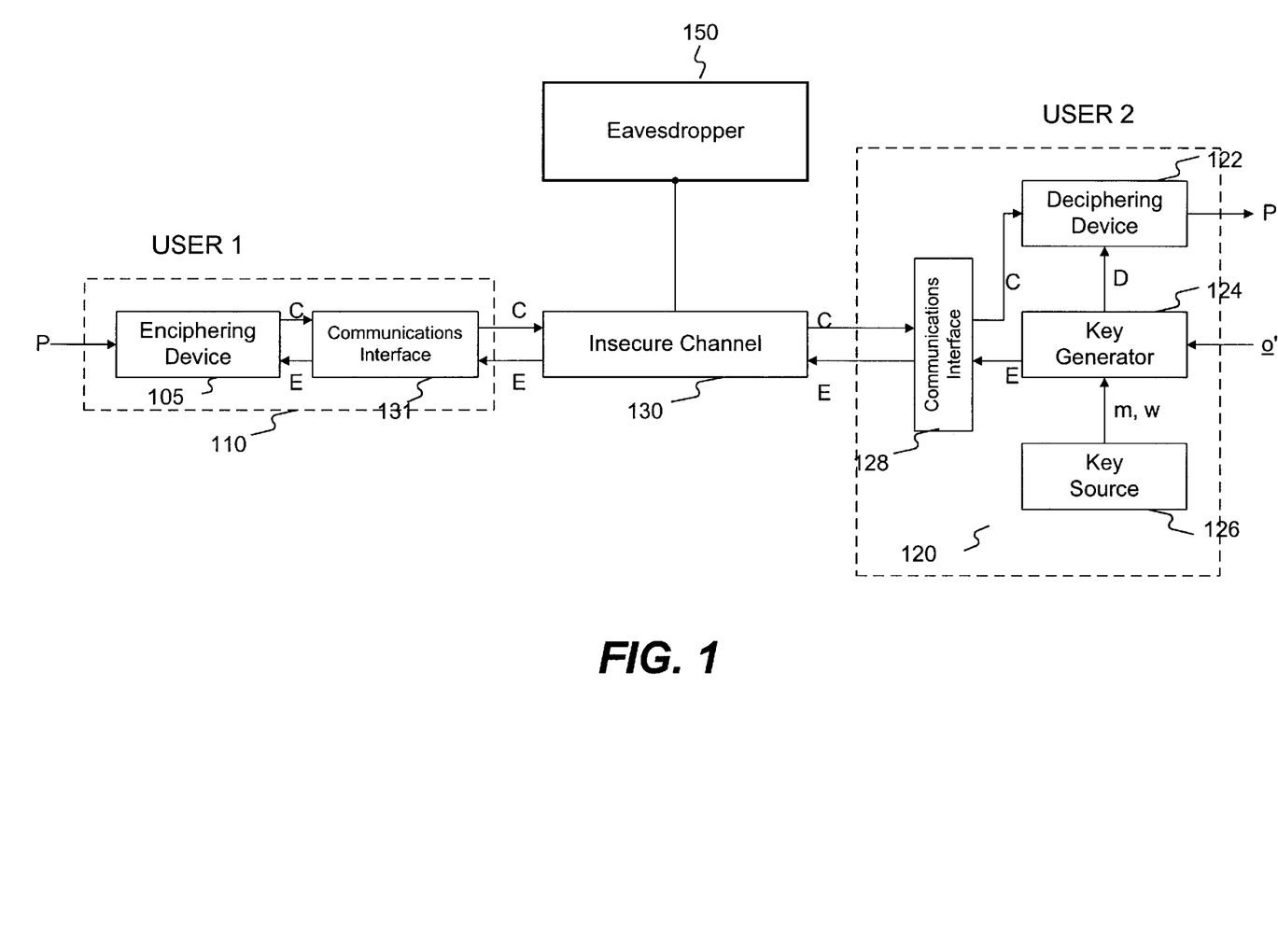
FIG. 1 is a block diagram of a public key cryptosystem that transmits a computationally secure cryptogram over an insecure communication channel.

FIG. 1 is a block diagram illustrating a general public key cryptosystem. Using a public key cryptosystem, if User1 wants to send an encrypted message to User2, User1 first obtains an encryption key from User2, which is also referred User2 must generate a public/private key pair using a known public key cryptosystem. Keys may be generated by, for example, key generator 124 with input from key source 126. Key source 126 may be, for example, a true random generator.

To communicate with User 2, User1 may obtain encryption key, E, that is, User2's public key, from User2 directly over an insecure communications channel 130 by, for example, User2 sending to User1 in an email or User1 downloading the public key from a web page. User1 encrypts plaintext message, P, using enciphering device 105 to obtain ciphertext, C. Enciphering device 105 encrypts P using a known public key algorithm. User1 then sends C to User2 over communications interface 131 and an insecure channel 130 such as, for example, by email over the Internet. User2 receives the ciphertext message, C, over a communications interface 128. User2 can decrypt C using deciphering device 122 and decryption key, D.

It is a common feature of public key distribution systems that an eavesdropper 150 will find it computationally infeasible to independently determine the underlying plaintext of ciphertext, C, even if eavesdropper 150 also collects encryption key, E.

The present invention is a new and fast public key distribution algorithm that uses only a modest number of weighted multi-precision integer additions (with small integer weights). Two entities may use the present invention to agree on cryptographic key information. One user transmits information based on a public key to another user over an insecure communications medium. Using the transmitted information, both parties may agree on the same cryptographic key information without compromising the security of the cryptosystem.

Methods and systems consistent with the present invention are based on approximate linear ("AL") functions, that is, any one of a family of functions AL(*, w) such that $AL(i+j, w) \sim AL(i, w) + AL(j, w)$, where w parameterizes the family by selecting a specific linear function, AL(*, w). In addition, AL has the following property that:

$$AL(i+j, w) \sim AL(i, w) + AL(j, w) \text{ mod } k,$$

the mathematical symbol "~" denoting that the result on the left hand side is "approximately equivalent" to the result on the right hand side. One exemplary definition for "approximately equivalent" is explained in more detail below.

In one exemplary embodiment of the present invention, a class of functions that are members of the set AL(i,w) and whose members have all the characteristics of this class may be defined by:

$$P(i, w) = \text{floor}(((w*i \text{ mod } m)/m)*k)$$

wherein k is an integer parameter and the parameters w and the modulus, m, are either real or integer values. All multiplication and division operations should be understood as the standard multiplication and division operations over the set of real numbers. Divisions, in particular, are not integer divides over the modulus m but are real divisions even if both operands happen to have integer values. The mod operation is also defined over the reals and produces a value which is greater than or equal to zero, and less than m.

The function floor(arg) is defined to be the greatest integer less than or equal to arg and therefore converts a real value to an integer value. The floor function will be used to explicitly indicate when real values should be converted to integers (possibly with loss of information caused by elimination of the fractional part). In this particular example, the numerator of the argument, that is, (w*i mod m)/m) will result in a real number between 0 and 1 (inclusive of 0 and exclusive of 1). After multiplication by k, a real number between 0 and k (inclusive of 0 and exclusive of k) results. The floorfunction converts this result to an integer greater than or equal to 0 and less than k.

In one exemplary embodiment consistent with the present invention, w, m, and k are assumed to be integers. In this particular example, it is also assumed that k and m are powers of 2, that is, $\log_2 m$ and $\log_2 k$ are both integers. Restricting k and m to be powers of 2 improves the efficiency of calculations, but is not required.

It can be shown both that the function P(i,w) is a member of a family of approximately linear functions, as defined above, and that P(i,w) produces an integer result. First, by looking at the definition of P(i,w), one can see that (w*i mod m)/m is a real number between 0 and 1 (inclusive of 0 and exclusive of 1). When this quantity is multiplied by the integer k, a real number between 0 and k (inclusive of 0 and exclusive of k) is produced. Converting the resulting quantity to an integer using the floor function produces an integer between 0 and k (inclusive of 0 and exclusive of k). Thus, the function AL(i, w) does indeed produce an integer result, as desired.

In addition, the class of functions P(i, w) satisfies the property: $AL(i+j, w) \sim AL(i, w) + AL(j, w) \text{ mod } k$. To show this, first define:

$$L(i, w) = ((w*i \text{ mod } m)/m)*k$$

L(i, w) maps integers onto reals by performing almost the same calculation as P(i, w) but leaving out the "floor" operation. L(i, w) satisfies the property:

$$L(i+j, w) = L(i, w) + L(j, w) \text{ mod } k$$

and, therefore, L(i, w) is a linear function. It can also be shown by repeated application of distributive laws:

$$\begin{aligned}
L(i+j, w) &= (w*(i+j) \text{mod } m/m)*k \\
&= (((w*i) + (w*j)) \text{mod } m/m)*k \\
&= ((w*i \text{mod } m) + (w*j \text{mod } m) - r*m)/m*k \\
&= ((w*i \text{mod } m)/m + (w*j \text{mod } m)/m - r*m/m)*k \\
&= ((w*i \text{mod } m)/m)*k + ((w*j \text{mod } m)/m)*k - \\
&\quad (r*m/m)*k \\
&= L(i, w) + L(j, w) - r*k
\end{aligned}$$

where r is 0 if (w*i mod m)+(w*j mod m) is less than m, and 1 otherwise. As the only difference between L(l, w) and P(l, w) is the floor operation, onr would expect that:

$$L(i+j, w) = L(i, w) + L(j, w) - r*k$$

would imply that $P(i+j, w) \sim P(i, w) + P(j, w) \text{ mod } k$, that is, that P(i,w) would be a member of the class of functions that are approximately linear. In fact, this approximate equality would frequently be exact, but would also frequently produce an integer result that was "off by one," which is one specific exemplary definition of "approximately linear."

In public-key distribution methods and systems consistent with the principles of the present invention, two users agree to use the same public key distribution system with system parameters m, k, and n. A first user (called Alice in this example) then generates a public/private key pair. In methods and systems consistent with the present invention, the private key comprises, w, a real or integer value known only to Alice. Private key, w, may be, for example, a randomly chosen vector of 0s and 1s of any length. The private key may optionally also comprise m, or m may be a fixed system parameter. The public key comprises a and b, where a and b are vectors having n elements and b=P(a,w), mod k. The a component of the public key may be chosen randomly or generated pseudo-randomly from a small key by, for example, using a block cipher to generate the pseudo random values of a. As b can be easily recomputed from w and a, if a is generated pseudo randomly from a small key, the total amount of information that must be stored for the private key is quite small.

As stated earlier, the public key may also optionally comprise k, or k may be a fixed system parameter. While k can, in principal, be any value, there is reason to believe that the choice of k may affect the security of the system.

In the following example, it is assumed that w and the elements of a are randomly chosen 200-bit quantities, that k is the integer $2^8$ (or 256), and that m is $2^{200}$. Also in this example, the $b_i$ are 8-bit quantities. In addition, m can be used as part of the private key, however, in the present example, m is a public and fixed system parameter to simplify the calculations. Thus, the secret key (in this example) is w alone.

After Alice determines the public/private key pair, she shares the public key with a second user called Bob in this example. Bob may obtain the public key using any method commonly associated with public key distribution such as, for example, Alice may email the public key to Bob or Alice may post the public key in a location that Bob can access. At this point, it is assumed that Bob knows a and b (from the public key) and the system parameters m, k and n (which are, in this example, fixed system parameters). Since she created the public/private key pair, Alice knows a and b (the public key), the system parameters m, k, and n and, in addition, knows w (the private key).

Figure 2:
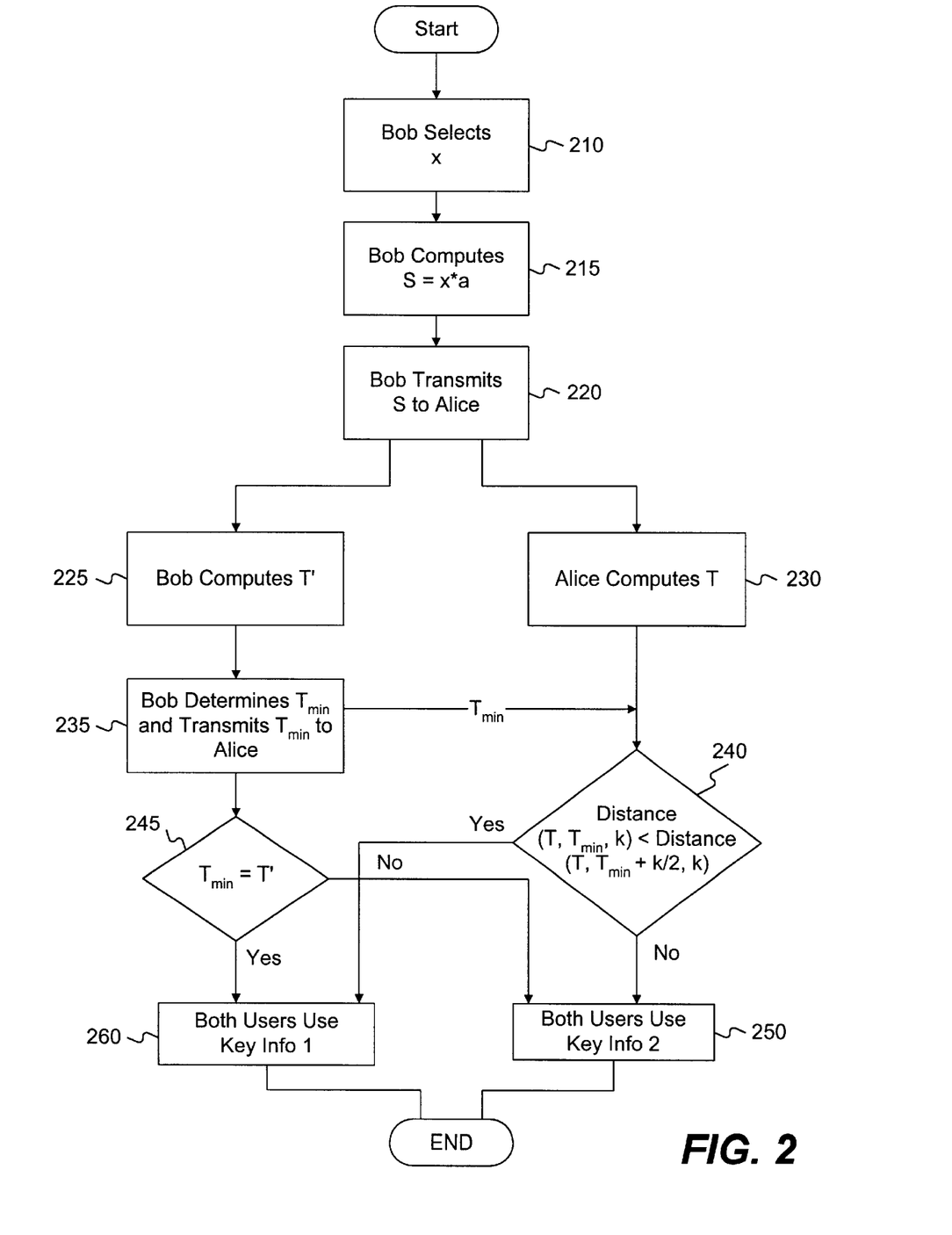
FIG. 2 illustrates the steps of one exemplary method consistent with the present invention for agreeing upon a common cryptographic key.

FIG. 2 illustrates the steps of one exemplary method for agreeing upon a common cryptographic key. To begin, Bob selects a random integer n-vector x (step 210) and computes S=x*a (step 215). The elements of vector x may be selected, for example, from the range [0,1] or the range [0,1,2,3], wherein the vector x is a vector of integers. In the two exemplary ranges, integers chosen from the first range, for example, may be represented using one bit and integers chosen from the second range may be represented using two bits.

Bob then transmits S to Alice (step 220). At this point, an eavesdropper on the insecure line may intercept S. Next, using S, Alice's private key (w), and system parameters, m and k, Alice computes T=P(S, w) as shown below (step 230).

$$T=P(S,w)=\text{floor}(((w*S \bmod m)/m)*k$$

Meanwhile, Bob may be computing T' by using system parameter, k, and the variable, x, known only to Bob, and adding elements of b (step 225).

$$T'=\text{floor}(x*(b+0.5) \bmod k)$$

Since b is a vector, the expression (b+0.5) represents the vector (b$_1$+0.5, b$_2$+0.5, b$_3$+0.5, . . . b$_n$+0.5).

It can be shown that T' is an approximation to T by first defining the difference between the approximately linear function, P, and the linear function, L, ("err") to be:

$$err=L(a, w)-P(a, w)-0.5=L(a, w)-b-0.5$$

Each err$_i$ may be treated as a random variable over the interval [−0.5 . . . 0.5] which has mean 0 and variance 1/12 (1/12 is the integral of $x^2$ over [−0.5 . . . 0.5]). The constant 0.5 is a consequence of the fact that, in this embodiment, P(i, w) is defined using the floor function rather than the nearest integer.

It may be shown that T approximates T' by the following repeated application of distributive laws.

$T=P(S,w)\sim L(S,w)$, then by substituting $S=x*a$ $T=P(S,w)\sim L(x*a,w)=x*L(a,w)$ $T\sim L(x*a,w)=x*(err+b+0.5)$ $T\sim x*err+x*(b+0.5)$ $T\sim x*(b+0.5)$ $T\sim T'$ where the error term (x*err) has mean 0 and variance, equal to:

$$\sum_{i=1}^{n} x_i^2 * \frac{1}{12}$$

After steps 225 and 230, Alice knows T and Bob knows P. As T~T', if k is sufficiently large, then Alice and Bob have agreed upon some common information. Cryptographic keys, however, must be bit-for-bit identical and, as stated above, while T may equal T', there is no guarantee that the two values are equal.

In methods consistent with the present invention, some mechanism of converting the approximately equal T and T' so that exactly the same information is known to Alice and Bob, without Bob simply transmitting T' to Alice or vice versa. This conversion can be accomplished by using any one of various error correcting methods.

One exemplary means of error correction is illustrated in steps 235 through 260. Assume, for example, that Alice and Bob wish to agree upon a single bit of cryptographic key information. Bob should not simply transmit T' to Alice because, doing so gives away information to any eavesdropper. Bob may instead transmit both T' and the value farthest away from T' mod k which, assuming k is divisibly by 2, is (T'+k/2) mod k. Alice could then determine if T is closer to T' or (T'+k/2) mod k. If T is closer to T', for example, then Alice and Bob can both agree on a common bit provided that T'-T (the error introduced by the approximation) isn't too large. For example, if T is closer to T', both Alice and Bob may select the bit, "0,"and, if otherwise, select the bit "1".

Transmitting both T' and (T'+k/2) mod k in a fixed order, however, would compromise the bit being agreed upon. In one embodiment consistent with the present invention, Bob transmits only the smaller of T' and (T'+k/2)mod k to Alice and therefore this problem may be avoided. As shown in FIG. 2, for example, Bob determines the minimum of the two numbers (step 235). This determination may be depicted mathematically as $T_{min}$=min(T', (T'+k/2) mod k). Bob then transmits $T_{min}$ to Alice (step 235).

If Bob transmitted T' (step 245), then Bob uses a first key information set such as, for example, "0" (step 260). Otherwise, Bob uses a second key set information such as, for example, bit "1" (step 250).

Meanwhile, Alice receives $T_{min}$ and can compare it to T. In one embodiment of the present invention, Alice compares T to $T_{min}$ by computing the distance (T, $T_{min}$, k) where distance (i,j,k) denotes the distance between i and j modulo k or, in other words, the minimum of (id) mod k and (j-i) mod k (step 240). If, for example, the distance (T, $T_{min}$, k) is less than distance (T, $T_{min}$+k/2, k), then Alice uses the first key information set (step 260). If the distance (T, $T_{min}$, k) is not less than the distance (T, $T_{min}$+k/2, k), Alice uses the second key information set (step 250). In this fashion, Alice and Bob may agree upon the same key information.

In this example, Alice and Bob have agreed on a single bit of key information. Systems and methods consistent with the present invention may also be used to agree on multiple bits of information at a time. Computing multiple bits in each operation may be one means of reducing the number of calculations performed and thereby increasing computation efficiency. In one embodiment, for example, Alice and Bob may agree, or the system parameters may be set, to select 2 bits of key information with each iteration. In this case, for example, after Bob computes T(step 225), Bob determines $T_{min}$ using the formula $T_{min}$=min(T', (T'+k/4) mod k, (T'+k/2) mod k, (T'+3k/4) mod k). In this instance, Bob determines the minimum distance between T' and four choices: $T_{min}$, ($T_{min}$+k/4) mod k, ($T_{min}$+2k/4) mod k, and ($T_{min}$+3k/4) mod k. In this example, $T_{min}$ will then be one drawn uniformly from the distribution [0, . . . k/4]. If Bob sends $T_{min}$ in step 235, then Bob uses 0 as the key information, which translates to "00" or two bits of key information. If, on the other hand, Bob transmits (T'+k/4) mod k as $T_{min}$, Bob then uses 1, or "01" as the two bits of key information. In this manner, more bits may be sent with each iteration. Transmitting a very large number of bits, however, may increase the rate of errors.

Another means for increasing computation efficiency is to share computations across repeated iterations of the method described in FIG. 2. For example, if Bob computes $S_1=x_1*a$ and $S_2=x_2*a$, $S_1$ and $S_2$ may be computed by first adding those elements of a that were both in $x_1$ and $x_2$, then sharing this common sum in the later computations. For example, if x1=01011 and x2=101 11, then the computation may be performed by computing, for example, $temp=(00011)*a$, $x1*a=(01000)*a+temp$, and $2x*a=(10100)*a+temp$.

Other methods of the total number of additions when many sums over the same vector a are to be computed are also possible, such as computing multiple temporary vectors, then looking for common elements in the vectors.

One means for reducing both the computational and communications overhead is to use more than one value for w and more than one vector b with the same vector a. For example, $W_2$ could be generated in addition to w, and create $b_2=AL(a, w_2)$. After selecting x, Bob would compute:

$T2'=floor(x*(b_2+0.5) mod\ k)$ while Alice would compute $T2=AL(S, w_2)$. The remaining calculations would proceed as before, but now Alice and Bob would be able to use S twice, and so agree on twice as many bits, while only calculating and transmitted S one time.

Having used $w_2$ and $b_2$, there is no problem in extending this to $W_3$ and $b_3$, $W_4$ and $b_4$, etc. This allows the single sum S to be used many times and to encode many bits. Communications overhead is reduced because fewer values of S need to be transmitted to generate the same number of common key bits. In addition, computational overhead is reduced because fewer values of S are computed.

In one embodiment, systems consistent with the present invention may resemble the public key cryptosystem depicted in FIG. 1. Bob may be User 1, for example, and Alice may be User 2. Systems, such as the one depicted in FIG. 1, may be used to generate and distribute information over insecure channel 130 that eventually would allow Bob and Alice to agree upon common key information. In one embodiment, the elements surrounded by dashed lines in FIG. 1 may be personal computers 110 and 120. Each of computers 110 and 120 may be equivalent, for example, to computer 310 in FIG. 3.

Figure 3:
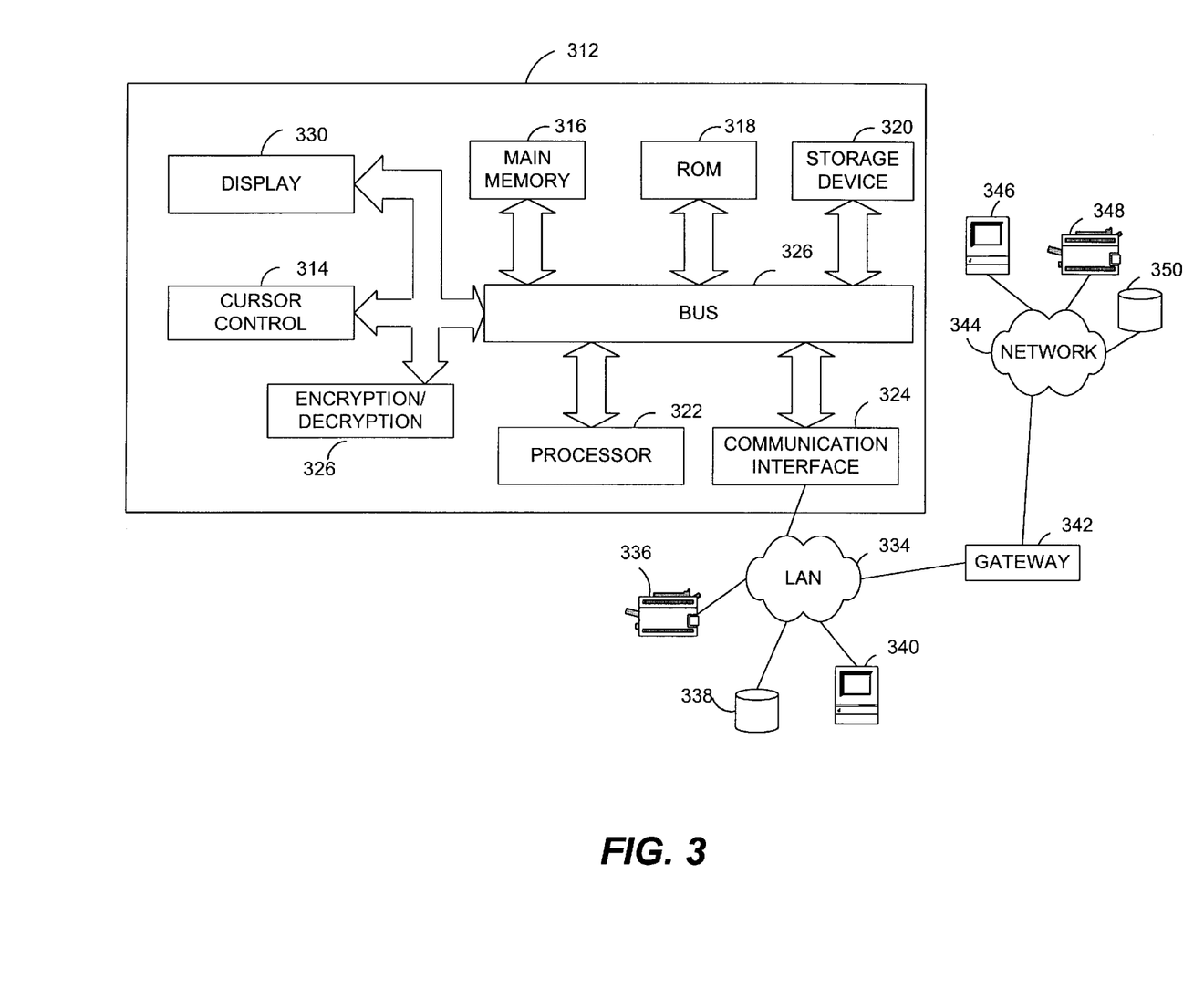

FIG. 3 illustrates a system suitable for public key distribution in a manner consistent with the present invention. Computer 310 comprises a processor 322, storage device 320, read only memory (ROM) 318, and main memory 316. The steps of methods consistent with the present invention may be, for example, executed by processor 322 or, optionally, a hardware device such as encryption/decryption device 326. Main memory 316 is a random access memory (RAM) or a dynamic storage device that stores instructions executed by processor 322. Main memory 316 may also store information used in executing instructions or data, such as cryptographic keys. ROM 318 is used for storing static information and instructions used by processor 322. Storage device 320, such as a magnetic or optical disk, also stores instructions and data used in the operation of computer system 312.

Computer 310 may also comprise a display 330 and cursor control 314, as well as user interface devices such as a mouse 330, trackball (not shown), or pen 310. Display 330 may be a CRT or other type of display device. Cursor control 314 controls cursor movement by the user interface devices on display Computer 310 may be connected to local area network (LAN) 334 for communicating with other devices connected to LAN 334. For example, LAN may be connected to a computer 340, a printer 336, and a mass storage 338. Computer 340 may be used by, for example, another user wishing to agree upon key information with Alice or Bob. LAN 334 may also be connected to a gateway 342 for connecting to another network 344. Network 344 may be connected to a computer 346, a printer 348, and a database 350. By connecting computer 312 to LAN 334 and network 344, computer 312 may communicate information to other computers across an insecure network in order to agree upon common key information in a manner consistent with the present invention. For example, Alice may communicate using computer 310, while Bob may be located across LAN 334 and Network 344 at computer 346.

The apparatus and methods described herein may be implemented by computer 310 using hardware, software, or a combination of hardware and software. For example, the apparatus and methods described herein may be implemented as a program in any one or more of main memory 316, ROM 318, or storage device 320. In one embodiment, processor 322 executes programs which compute the intermediate values that Bob sends to Alice.

Such programs may be read into main memory 316 from another computer-readable medium, such as storage device 320. Execution of sequences of instructions contained in main memory 316 causes processor 322 to perform the process steps consistent with the present invention described herein. Execution of sequences of instructions contained in main memory 316 also causes processor to implement apparatus elements that perform the process steps. Hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 322 for execution. Such a medium may take many forms, including but not limited to, non-volatile memory media, volatile memory media, and transmission media. Non-volatile memory media includes, for example, optical or magnetic disks, such as storage device 320. Volatile memory media includes RAM, such as main memory 316. Transmission media includes coaxial cables, copper wire and fiber optics, including the wires that comprise bus 326. Transmission media can also take the form of acoustic or light waves, such as those generated during radiowave and infrared data communications.

Common forms of computer-readable media include, for example, a floppy disk, a flexible disk, hard disk, magnetic tape, or any other magnetic storage medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read and use.

Various forms of computer readable media may be involved in carrying one or more sequences of instructions to processor 322 for execution. For example, the instructions may initially be carried on a magnetic disk or a remote computer. The remote computer can load the instructions into its dynamic memory and send the instructions over a telephone line using a modem. A modem local to computer system 312 can receive the data on the telephone line and use an infrared transmitter to convert the data to an infrared signal. An infrared detector coupled to appropriate circuitry can receive the data carried in the infrared signal and place the data on bus 326. Bus 326 carries the data to main memory 316, from which processor 322 retrieves and executes the instructions. The instructions received by main memory 316 may optionally be stored on storage device 320 either before or after execution by processor 322.

Computer system 312 also includes a communication interface 324 coupled to bus 326. Communication interface 324 provides two way communications to other systems. For example, communication interface 324 may be an integrated services digital network (ISDN) card or a modem to provide a data communication connection to a corresponding type of telephone line. Communication may also be, for example, a local area network (LAN) card to provide communication to a LAN. Communication interface 324 may also be a wireless card for implementing wireless communication between computer system 312 and wireless systems. In any such implementation, communication interface 324 sends and receives electrical, electromagnetic or optical signals that carry data streams representing various types of information.

The link between communication interface 324 and external devices and systems typically provides data communication through one or more networks or other devices. For example, the link may provide a connection to a local network (not shown) to a host computer or to data equipment operated by an Internet Service Provider (ISP). An ISP provides data communication services through the world wide packet data communications network now commonly referred to as the "Internet." Local networks and the Internet both use electrical, electromagnetic or optical signals that carry digital data streams. The signals through the various networks and the signals between the networks and communication interface 324, which carry the digital data to and from computer system 312, are exemplary forms of carrier waves transporting the information.

Computer system 312 can send messages and receive data, including program code, through the network(s) via the link between communication interface 324 and the external systems and devices. In the Internet, for example, a server might transmit a requested code for an application program through the Internet, an ISP, a local network, and communication interface 324.

Program code received over the network may be executed by processor 322 as it is received, and/or stored in memory, such as in storage device 320, for later execution. In this manner, computer system 312 may obtain application code in the form of a carrier wave.

Other embodiments of the invention will be apparent to those skilled in the art from consideration of the specification and practice of the disclosed embodiments. The specification and examples are exemplary only, and the true scope and spirit of the invention is defined by the following claims and their equivalents.

What is claimed is:

1. A method of agreeing on common cryptographic key information between a first and second entity over an insecure communications channel, wherein the second entity is associated with a public/private key pair based on a public key algorithm, the method comprising the steps of:

the first entity determining a first value, x;

the first entity determining a weighted sum based on the first value and a first part of a public key corresponding to the second entity;

the first entity transmitting the weighted sum to the second entity;

the first entity determining a first comparator based on the first value and a second part of a public key corresponding to the second entity;

the second entity determining a second comparator representing an approximate version of the first comparator; and the first and second entities agreeing on cryptographic key information based on the first and second comparators.

2. The method of claim 1, wherein the step of the first and second entities agreeing on cryptographic key information based on the first and second comparators comprises:

the first entity transmitting to the second entity a minimum of the first comparator and a second number mathematically related to the first comparator;

the first entity using a first key information set, if the minimum equals the first comparator and using a second key information set, if the minimum equals the second number;

the second entity determining if the second comparator is closer to the minimum or a third number mathematically related to the second comparator; and the second entity using a first key information set, if the second comparator is closer to the minimum and using a second key information set, if second comparator is closer to the third number.

3. The method of claim 2, wherein a second number mathematically related to the first comparator is a number farthest away from the first comparator modulo k and a third number mathematically related to the second comparator is a number farthest away from the second comparator modulo k.

4. A method of agreeing on common cryptographic key information between a first and a second entity over an insecure communications channel, wherein the second entity is associated with a public/private key pair based on a public key algorithm, the method comprising the steps of:

the first entity selecting a first value;

the first entity determining a second value based on the first value and a first part of a public key corresponding to the second entity;

the first entity transmitting the second value to the second entity over the insecure communications channel;

the first entity determining a first comparator based on a first approximately linear function, the first value, and a second part of a public key corresponding to the second entity;

the first entity transmitting a third value to the second entity, the third value based on the first comparator;

the second entity determining a second comparator based on the second value and a second approximately linear function related to the first approximately linear function; and the first and second entities agreeing on cryptographic key information based on the third value and the second comparator.

5. The method of claim 4, wherein the step of the first and second entities agreeing on cryptographic key information based on the first and second II comparators comprises:

the first entity transmitting to the second entity a minimum of the first comparator and a second number mathematically related to the first comparator;

the first entity using a first key information set, if the minimum equals the first comparator and using a second key information set, if the minimum equals the second number;

the second entity determining if the second comparator is closer to the minimum or a third number mathematically related to the second comparator; and the second entity using a first key information set, if the second comparator is closer to the minimum and using a second key information set, if second comparator is closer to the third number.

6. The method of claim 5, wherein a second number mathematically related to the first comparator is a number farthest away from the first comparator modulo k and a third number mathematically related to the second comparator is a number farthest away from the second comparator modulo k.

7. A public key distribution system for agreeing on common cryptographic key information between a first and a second entity over an insecure communications channel, wherein the second entity is associated with a public/private key pair based on a public key algorithm, the system comprising:

the first entity comprising:
means for determining a first value, x;
means for determining a weighted sum based on the first value and a first part of a public key corresponding to the second entity;
means for transmitting the weighted sum to the second entity;
means for determining a first comparator based on the first value and a second part of a public key corresponding to the second entity;
means for selecting a key information set based on the first comparator, the second entity comprising:
means for determining a second comparator representing an approximate version of the first comparator; and
means for selecting the key information set based on the second comparator and the second value.

8. The system of claim 7, wherein the means for selecting a key information set based on the first comparator comprises:
means for transmitting to the second entity a minimum of the first comparator and a second number mathematically related to the first comparator; and means for using a first key information set, if the minimum equals the first comparator and using a second key information set, if the minimum equals the second number.

9. The system of claim 7, wherein the means for selecting the key information set based on the second comparator comprises:
means for determining if the second comparator is closer to the minimum or a third number mathematically related to the second comparator; and
means for using a first key information set, if the second comparator is closer to the minimum and using a second key information set, if second comparator is closer to the third number.

10. The system of claim 8, wherein a second number mathematically related to the first comparator is a number farthest away from the first comparator modulo k.

11. The system of claim 9, wherein a third number mathematically related to the second comparator is a number farthest away from the second comparator modulo k.

12. A public key distribution system for agreeing on common cryptographic key information between a first and a second entity over an insecure communications channel, wherein the second entity is associated with a public/private key pair based on a public key algorithm, the system comprising:

the first entity comprising:
means for determining a first value, x;
means for determining a second value based on the first value and a first part of a public key corresponding to the second entity;
means for transmitting the second value to the second entity;
means for determining a first comparator based on the first value and a second part of a public key corresponding to the second entity;
means for selecting a key information set based on the first comparator, the second entity comprising:
means for determining a second comparator representing an approximate version of the first comparator; and
means for selecting the key information set based on the second comparator.

13. The system of claim 12, wherein the means for selecting a key information set based on the first comparator comprises:
means for transmitting to the second entity a minimum of the first comparator and a second number mathematically related to the first comparator; and
means for using a first key information set, if the minimum equals the first comparator and using a second key information set, if the minimum equals the second number.

14. The system of claim 12, wherein the means for selecting the key is information set based on the second comparator comprises:
means for determining if the second comparator is closer to the minimum or a third number mathematically related to the second comparator; and
means for using a first key information set, if the second comparator is closer to the minimum and using a second key information set, if second comparator is closer to the third number.

15. The system of claim 13, wherein a second number mathematically related to the first comparator is a number farthest away from the first comparator modulo k.

16. The system of claim 14, wherein a third number mathematically related to the second comparator is a number farthest away from the second comparator modulo k.

17. A computer-readable medium containing instructions for instructing a computer to perform a method of agreeing on common cryptographic key information between a first and second entity over an insecure communications channel, wherein the second entity is associated with a public/private key pair based on a public key algorithm, the method comprising the steps of:

the first entity determining a first value, x;

the first entity determining a weighted sum based on the first value and a first part of a public key corresponding to the second entity;

the first entity transmitting the weighted sum to the second entity;

the first entity determining a first comparator based on the first value and a second part of a public key corresponding to the second entity;

the second entity determining a second comparator representing an approximate version of the first comparator; and the first and second entities agreeing on cryptographic key information based on the first and second comparators.

18. The computer-readable medium of claim 17, wherein the step of the first and second entities agreeing on cryptographic key information based on the first and second comparators comprises:

the first entity transmitting to the second entity a minimum of the first comparator and a second number mathematically related to the first comparator;

the first entity using a first key information set, if the minimum equals the first comparator and using a second key information set, if the minimum equals the second number;

the second entity determining if the second comparator is closer to the minimum or a third number mathematically related to the second comparator; and the second entity using a first key information set, if the second comparator is closer to the minimum and using a second key information set, if second comparator is closer to the third number.

19. The computer-readable medium of claim 18, wherein a second number mathematically related to the first comparator is a number farthest away from the first comparator modulo k and a third number mathematically related to the second comparator is a number farthest away from the second comparator modulo k.

20. A computer-readable medium containing instructions for instructing a computer to perform a method of agreeing on common cryptographic key information between a first and second entity over an insecure communications channel, wherein the second entity is associated with a public/private key pair based on a public key algorithm, the method comprising the steps of:

the first entity selecting a first value;

the first entity determining a second value based on the first value and a first part of a public key corresponding to the second entity;

the first entity transmitting the second value to the second entity over the insecure communications channel;

the first entity determining a first comparator based on a first approximately linear function, the first value, and a second part of a public key corresponding to the second entity;

the first entity transmitting a third value to the second entity, the third value based on the first comparator;

the second entity determining a second comparator based on the second value and a second approximately linear function related to the first approximately linear function; and the first and second entities agreeing on cryptographic key information based on the third value and the second comparator.

21. The computer-readable medium of claim 20, wherein the step of the first and second entities agreeing on cryptographic key information based on the first and second comparators comprises:

the first entity transmitting to the second entity a minimum of the first comparator and a second number mathematically related to the first comparator;

the first entity using a first key information set, if the minimum equals the first comparator and using a second key information set, if the minimum equals the second number;

the second entity determining if the second comparator is closer to the minimum or a third number mathematically related to the second comparator; and the second entity using a first key information set, if the second comparator is closer to the minimum and using a second key information set, if second comparator is closer to the third number.

22. The computer-readable medium of claim 21, wherein a second number mathematically related to the first comparator is a number farthest away from the first comparator modulo k and a third number mathematically related to the second comparator is a number farthest away from the second comparator modulo k.

* * * * *